United States Patent [19]

Nakata et al.

[11] Patent Number: 5,002,983

[45] Date of Patent: Mar. 26, 1991

[54] POLYARYLENE SULFIDE RESIN COMPOSITION HAVING EXCELLENT PAINTABILITY

[75] Inventors: Akira Nakata, Otake; Naoki Yamamoto, Otake; Hiroshi Mori, Otake; Takuya Ueno, Kobe, all of Japan

[73] Assignee: Mitsubishi Rayon Co., Ltd., Tokyo, Japan

[21] Appl. No.: 476,604

[22] Filed: Feb. 7, 1990

[30] Foreign Application Priority Data

Feb. 7, 1989 [JP] Japan ................................ 01-027828
Feb. 16, 1989 [JP] Japan ................................ 01-037242

[51] Int. Cl.$^5$ ........................................... C08G 63/91
[52] U.S. Cl. ................................ 523/512; 523/523; 523/526; 523/527; 524/513; 524/539; 525/36; 525/37; 525/38; 525/39; 525/40; 525/41; 525/43; 525/44; 525/46; 525/47; 525/48; 525/49; 525/189; 525/445; 525/537
[58] Field of Search ............... 524/539; 525/537, 437, 525/445, 36, 37, 38, 39, 40; 523/512, 523, 526, 527

[56] References Cited

U.S. PATENT DOCUMENTS

| | | | |
|---|---|---|---|
| 4,251,429 | 2/1981 | Salee | 524/539 |
| 4,528,346 | 7/1985 | Sugie et al. | 525/537 |
| 4,849,469 | 7/1989 | Crosby et al. | 524/439 |

FOREIGN PATENT DOCUMENTS

| | | | |
|---|---|---|---|
| 286257 | 10/1988 | European Pat. Off. | 525/537 |
| 315478 | 5/1989 | European Pat. Off. | 525/537 |
| 315480 | 5/1989 | European Pat. Off. | 525/537 |
| 57-168945 | 10/1982 | Japan . | |
| 59-64655 | 4/1984 | Japan . | |
| 59-64657 | 4/1984 | Japan . | |
| 62-218436 | 9/1987 | Japan . | |
| 62-218441 | 9/1987 | Japan . | |
| 5358 | 8/1988 | Japan . | |

Primary Examiner—John C. Bleutge
Assistant Examiner—David W. Woodward
Attorney, Agent, or Firm—Cushman, Darby & Cushman

[57] ABSTRACT

A polyarylene sulfide resin composition comprising a composition obtainable by a reaction of a polymer composition comprising (A) 100 parts by weight of a polyarylene sulfide resin,
(B) 0.1 to 40 parts by weight of a monomer having one or more ethylenic unsaturated bonds and
(C) 0 to 40 parts by weight of an unsaturated polyester. In the polyarylene sulfide resin composition of the present invention, a polymer produced by polymerization of the monomer or the monomer and unsaturated polyester, as compared with a resin composition wherein said polymer is simply blended, is in a state wherein it is uniformly mixed with the polyarylene sulfide resin and if necessary a filler. In other words, said polymer is uniformly dispersed in and mixed with the polyarylene sulfide resin to such a degree that the composition shows no phase separation even if it is passed through molding processes such as extrusion molding, injection molding, etc. carried out under normal conditions. Futher, the amount of said polymer added to the polyarylene sulfide resin is so proper that an excellent-performance resin composition to which an adhesive property of paint film (paintability) has been given, is obtained without a large reduction in the excellent properties of the polyarylene sulfide resin.

10 Claims, No Drawings

POLYARYLENE SULFIDE RESIN COMPOSITION HAVING EXCELLENT PAINTABILITY

The present invention relates to a polyarylene sulfide resin composition.

Demand for the polyarylene sulfide resin has recently increased as engineering plastics excellent in heat resistance, solvent resistance, hydrolysis resistance, flame retardancy and mechanical properties.

However, the polyarylene sulfide resin is poor in paintability. In other words, when a paint is applied to the surface of molded products produced from the resin and then cured, the adhesive property of the paint film is so poor that there has been a problem of this resin being difficult to use as a material for exterior use.

In view of such a situation, the present inventors have eagerly studied a polyarylene sulfide resin composition which have been improved in paint-ability without a large reduction in the heat resistance, mechanical strength, etc. inherent to the polyarylene sulfide resin. The present inventors thus attained to the present invention.

The present invention relates to a polyarylene sulfide resin composition comprising a composition obtainable by a reaction of a polymer composition comprising (A) 100 parts by weight of a polyarylene sulfide resin, (B) 0.1 to 40 parts by weight of a monomer having one or more ethylenic unsaturated bonds (hereinafter referred to as the monomer (B), too), and (C) 0 to 40 parts by weight of an unsaturated polyester. An object of the present invention is to provide a polyarylene sulfide resin composition excellent in paintability.

Other objects and advantages will become apparent from the following description.

The polyarylene sulfide resin used in the present invention is a polymer having as a main constituent unit a repeating unit represented by the formula,

wherein Ar represents

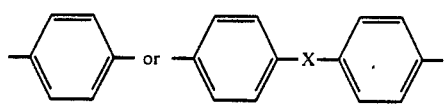

(in which X represents $-S_2-$, $-CO-$, $-O-$ or an alkylene group of which the main chain has 5 or less carbon atoms and may have 0-2 methyl side chains bonded thereto) or the above aromatic ring having 1 to 3 halogen atoms or methyl groups as a substituent(s) or a mixture thereof. These polyarylene sulfide resins may be used alone or in combination. Among these polyarylene sulfide resins, polyphenylene sulfide is more preferably used.

As the monomer (B) which polymerizes in the presence of the polyarylene sulfide resin, any of those having one or more polymerizable ethylenic unsaturated bonds may be used. As examples of such a monomer, there may be mentioned aromatic alkenyl compounds such as styrene, α-methylstyrene, vinylstyrene, vinyltoluene, vinylnaphthalene, vinylanthracene, etc.; (meth)acrylates such as methyl (meth)acrylate, ethyl (meth)acrylate, butyl (meth)acrylate, 2-ethylhexyl (meth)acrylate, lauryl (meth)acrylate, dodecyl (meth)acrylate, stearyl (meth)acrylate, 2-hydroxyethyl (meth)acrylate, 2-hydroxypropyl (meth)acrylate, cyclohexyl (meth)acrylate, glycidyl (meth)acrylate, dimethylaminoethyl methacrylate, diethylaminoethyl (meth)acrylate, tetrahydrofurfuryl (meth)acrylate, etc.; N-substituted or non-substituted maleimides such as maleimide, N-methylmaleimide, N-phenylmaleimide, N-ethylmaleimide, N-cyclohexylmaleimide, etc.; (meth)acrylamides such as (meth)acrylamide, N-methyl(meth)acrylamide, N,N-dimethyl(meth)acrylamide, etc.; unsaturated acids or unsaturated acid anhydrides such as (meth)acrylic acid, maleic acid, itaconic acid, maleic acid anhydride, itaconic acid anhydride, etc.; vinyl cyanides such as (meth)acrylonitrile, etc.; vinyl ether compounds such as vinyl ethyl ether, etc.; and compounds having a plural number of ethylenic unsaturated bonds such as allyl methacrylate, diallyl phthalate, ethylene glycol dimethacrylate, 1,3-butylene glycol dimethacrylate, trimethylolpropane trimethacrylate, etc. In terms of polymerizability and the paintability of a molded polymer obtained by polymerization, styrene, α-methylstyrene, methyl (meth)-acrylate, ethyl (meth)acrylate, 2-ethylexyl (meth)-acrylate, 2-hydroxyethyl (meth)acrylate, glycidyl (meth)acrylate, N-methylmaleimide, N-phenylmaleimide, (meth)acrylamide, (meth)acrylic acid, maleic acid anhydride and (meth)acrylonitrile are preferred. More preferably, styrene, α-methylstyrene, (meth)acrylic acid, methyl (meth)acrylate, glycidyl (meth)acrylate and acrylonitrile are used. The monomers (B) are used alone or in combination.

The unsaturated polyester (C) used in the present invention means a polyester having an ethylenic unsaturated bond, and it is obtained by the condensation of at least one dibasic acid having no ehtylenic unsaturated double bond, at least one unsaturated dibasic acid and at least one dihydric alcohol.

The dibasic acid having no ethylenic unsaturated double bond used here includes dicarboxylic acids, their anhydrides and their halogenated derivatives such as terephthalic acid, isophthalic acid, phthalic acid, phthalic acid anhydride, naphthalene-dicarboxylic acid, 4,4'-diphenyletherdicarboxylic acid, diphenyletherdicarboxylic acid, α,β-bis(4-carboxyphenoxy)-ethane, adipic acid, sebacic acid, azelaic acid, decanedicarboxylic acid, dodecanedicarboxylic acid, cyclohexanedicarboxylic acid, endic acid, chlorendic acid, tetrabromophthalic acid, etc.

The unsaturated dibasic acid includes dicarboxylic acids having one or more ethylenic unsaturated double bonds in the molecule such as maleic acid anhydride, fumaric acid, tetrahydrophthalic acid, itaconic acid, etc.

The dihydric alcohol includes ethylene glycol, propylene glycol, butanediol, diethylene glycol, trimethylene glycol, trimethylpentanediol, trimethylolpropane monoallyl ether, hydrogenated bisphenol, bisphenol dioxypropyl ether, pentanediol, neopentyl glycol, hexanediol, octanediol, decanediol, cyclohexanedimethanol, hydroquinone, bisphenol A, 2,2-bis(4-hydroxyethoxyphenyl)propane, xylylene glycol, polyethylene ether glycol, polytetramethylene ether glycol, aliphatic or aroamtic polyester oligomers having a hydroxyl group at the both terminals, etc.

In producing the unsaturated polyester in the present invention, the following comonomers may be used as an additional component in addition to the foregoing components: Hydroxycarboxylic acids such as glycolic acid, hydroxybutyric acid, hydroxybenzoic acid, hydroxyphenylacetic acid, naphthylglycolic acid, etc.;

and lactone compounds such as propiolactone, butyrolactone, valerolactone, caprolactone, etc. Similarly, the following polyfunctional ester-forming comonomers may be used so far as they do not inhibit the homogeneous compatibility between the polyarylene sulfide resin and unsaturated polyester: Trimethylolpropane, trimethylolethane, glycerin, pentaerythritol, trimellitic acid, trimesic acid, pyromellitic acid, etc. A preferred unsaturated polyester used in the present invention is one obtained by co-condensation of maleic acid anhydride, phthalic acid anhydride, propylene glycol and ethylene glycol.

An amount of the monomer (B) used in the present invention is preferably 0.1 to 40 parts by weight based on 100 parts by weight of the polyarylene sulfide resin (A), and an amount of the unsaturated polyester (C) is 0 to 40 parts by weight based on the same. When the monomer (B) and unsaturated polyester (C) are used together, the total amount of the both is preferably 0.1 to 40 parts by weight based on 100 parts by weight of the polyarylene sulfide resin (A), and besides a weight ratio of monomer to unsaturated polyester is preferably 80:20 to 20:80. The most preferred amount of the monomer (B), or the monomer (B) and unsaturated polyester (C) is 5 to 40 parts by weight based on 100 parts by weight of the polyarylene sulfide resin (A).

When the amount of the monomer (B), or the monomer (B) and unsaturated polyester (C) is less than 0.1 part by weight, a paintability improving effect is not sufficient, and even if it exceeds 40 parts by weight, the excellent characteristics inherent to the polyarylene sulfide resin cannot sufficiently be exhibited.

The polyarylene sulfide resin composition of the present invention may contain a filler as an additional component in an amount of 0 to 300 wt. % based on the total weight of the components (A), (B) and (C).

The filler may have any form of fibrous forms, powdery forms, granular forms and others. Examples of the filler include glass fibers, carbon fibers, potassium titanate, asbestos, silicon carbide, ceramics fibers, metal fibers, silicon nitride, aramide fibers, barium sulfate, calcium sulfate, calcium silicate, calcium carbonate, magnesium carbonate, dolomite, antimony trioxide, zinc oxide, titanium oxide, magnesium oxide, iron oxide, molybdenum disulfide, mica, talc, kaolin, pyrophyllite, bentonite, sericite, zeolite, attapulgite, wollastonite, other clays, ferrite, graphite, gypsum, glass beads, quartz, etc. When these fillers are used, their amount is preferably 300 wt. % or less based on the total amount of the polyarylene sulfide resin (A), the monomer (B) and the unsaturated polyester (C). When the amount exceeds 300 wt. %, the melt-flowability of the polyarylene sulfide resin composition becomes poor, and therefore the appearance of the molded product undesirably tends to be injured.

In the composition of the present invention, it is desirable that the polyarylene sulfide resin, a polymer produced by polymerization of the foregoing monomer and if necessary, the filler are in a substantially uniformly mixed and dispersed state. Further, a part of the above polymer may be grafted to the polyarylene sulfide resin.

Into the composition of the present invention may be incorporated, if necessary, a mold-release agent, coloring agent, heat stabilizer, ultraviolet light absorber, foaming agent, rust preventive, flame retardant, flame retarding assistant, etc., so far as the characteristics of the present composition are not much injured.

The composition of the present invention can be obtained by the bulk polymerization method in which the monomer is polymerized in a state wherein the polyarylene sulfide resin (A), the monomer (B) or the monomer (B) and unsaturated polyester (C), and a radical polymerization initiator are mixed, or in a state wherein the polyarylene sulfide resin in a molten state and the foregoing other components are mixed or kneaded, or by the solution polymerization or suspension polymerization method in which the monomer is polymerized in a state wherein the polyarylene sulfide resin and the monomer or the monomer and unsaturated polyester are mixed. However, it is preferred to carry out the polymerization in a state wherein the monomer or the monomer and unsaturated polyester and the radical polymerization initiator are mixed or kneaded with the polyarylene sulfide resin in a molten state.

When the filler is contained in the polyarylene sulfide resin composition, it may be allowed to coexist at the time of the polymerization of the monomer, or it may be added after the polymerization.

When the monomer is polymerized in a state wherein it is mixed or kneaded with the polyarylene sulfide resin, there may be used any of radical polymerization initiators which can polymerize the monomer in this mixed or kneaded state. Since, however, the polyarylene sulfide resin has a melting temperature as high as 290° C. or more, a radical polymerization initiator having a half-life period of 1 minute or more at 100° C. is preferred as the initiator used in polymerizing the monomer in a molten state of the polyarylene sulfide resin. Such the initiator includes benzoyl peroxide, p-chlorobenzoyl peroxide, 2,4-dichlorobenzoyl peroxide, acetyl peroxide, methyl ethyl ketone peroxide, dicumyl peroxide, tert-butyl perbenzoate, etc. When the polyemrization is carried out in a melt-mixed state or kneaded state of the polyarylene sulfide resin and other components, an amount of the initiator is preferably 0.01 to 20 parts by weight based on 100 parts by weight of the total weight of the monomer, unsaturated polyester and polyarylene sulfide resin.

When the polymerization of the monomer or the monomer and unsaturated polyester is carried out in a melt-mixed state or kneaded state of the polyarylene sulfide resin and other components, it is preferred to carry out the polymerization in the inside of an extruder. In other words, it is preferred to carry out the polymerization while passing a mixture of the polyarylene sulfide resin, the monomer or the monomer and unsaturated polyester, the radical polymerization initiator and if necessary the filler (D) and other additives through an extruder under common extrusion conditions for the polyarylene sulfide resin or under conditions similar thereto.

In the polyarylene sulfide resin composition of the present invention thus obtained, a polymer produced by polymerization of the monomer or the monomer and unsaturated polyester, as compared with a resin composition wherein said polymer is simply blended, is in a state wherein it is uniformly mixed with the polyarylene sulfide resin. In other words, said polymer is uniformly dispersed in and mixed with the polyarylene sulfide resin to such a degree that the composition shows no phase separation even if it is passed through molding processes such as extrusion molding, injection molding, etc. carried out under normal conditions. Further, the amount of said polymer added to the polyarylene sulfide resin is so proper that an excellent-performance resin composition to which an adhesive property of paint film (paintability) has been given, is obtained without a large reduction in the excellent properties of the polyarylene sulfide resin.

The present invention will be illustrated in more detail with reference to the following examples. However, the present invention should not be construed to be restricted by these examples.

In the examples and comparative examples, the adhesive property of a paint film was measured as follows: A paint is applied to the surface of a flat molded product and dried; 11 parallel grooves are cut into the paint film at intervals of 1 mm in one direction, and the same procedure is repeated in the direction perpendicular thereto, thereby forming 100 1 $\overline{mm^2}$ grid patterns; and adhesive tape is applied over the cross-hatched area and peeled off the area in the vertical direction to the surface of the flat molded product; and the number of the paint films peeled off the area is counted. The adhesive property of the paint film is evaluated according to the following standard:

|  | The number of peeled paint films |
| --- | --- |
| Excellent [⬤]: | 10 or less |
| Good [◉]: | 11 to 20 |
| Not good [Δ]: | 21 to 40 |
| Bad [X]: | 41 or more |

The appearance of the flat molded product is visually inspected and evaluated according to the following standard:

Good [O] The surface is uniform and pearly luster is not observed over the whole surface.

Not good [Δ]: Pearly luster is observed only in the vicinity of the gate.

Bad [X]: Pearly luster is remarkable.

The heat distortion temperature (HDT) was measured according to ASTM D 256 (with a load of 18.56 kg).

EXAMPLES 1 TO 7 AND COMPARATIVE EXAMPLES 1 and 2

A powdery polyphenylene sulfide resin (Tohpren T-4 produced by Tohpren Co., Ltd.; average particle size, 50 μm), which is a polyarylene sulfide resin, a monomer having one or more ethylenic unsaturated bonds shown in Table 1 and a radical polymerization initiator shown in Table 1 were sufficiently mixed on a Henschel mixer in proportions shown in Table 1. The mixture was extruded through a twin-screw extruder (Werner & Pfleiderer 30 Φ) at a barrel temperature of 310° C. and pelletized on a pelletizer.

The resulting pellet was molded into a flat plate of 100×100×3 mm in size on an injection molding machine (IS-100 produced by Toshiba Machine Co., Ltd.) under a condition that the cylinder temperature was 310° C. and the mold temperature was 140° C.. The appearance of the plate was inspected. The surface thereof was defatted by wiping it with methanol, and coated with an epoxy resin paint (Epona 2000 produced by Origin Denki Co.) under normal conditions. The peeling test was carried out. The results are shown in Table 1.

For the purpose of comparison, the above procedure was repeated in the same manner as above except that the same polyphenylene sulfide resin only as above was used (Comparative Example 1), and that a simple blend of the polyphenylene sulfide resin and polystyrene was used (Comparative Example 2). Thus, a flat plate was obtained. In the same manner as above, the plate was painted and subjected to the peeling test. The results are collectively shown in Table 1.

TABLE 1

|  | PPS (part by weight) | Monomer (part by weight) | | | | PSt (part by weight) | Polymerization initiator (part by weight) | | Adhesive property of paint film | Appearance |
| --- | --- | --- | --- | --- | --- | --- | --- | --- | --- | --- |
|  |  | St | AN | GMA | MMA |  | BPO | CPO |  |  |
| Example 1 | 95 | 5 | — | — | — | — | 0.5 | — | O | O |
| Example 2 | 80 | 20 | — | — | — | — | 1 | — | ◉ | O |
| Example 3 | 90 | 7 | 3 | — | — | — | 1 | — | ◉ | O |
| Example 4 | 90 | 5 | — | 5 | — | — | 1 | — | O | O |
| Example 5 | 90 | — | — | — | 10 | — | 1 | — | O | O |
| Example 6 | 80 | 10 | — | — | 10 | — | 1 | — | ◉ | O |
| Example 7 | 80 | 20 | — | — | — | — | — | 1 | ◉ | O |
| Comparative Example 1 | 100 | — | — | — | — | — | — | — | X |  |
| Comparative Example 2 | 80 | — | — | — | — | 20 | — | — | X | X |

Note:
PPS: Polyphenylene sulfide resin
GMA: Glycidyl methacrylate
BPO: Benzoyl peroxide
CPO: Dicumyl peroxide
PSt: Esbrite 6P (produced by Sumitomo Chemical Co., Ltd.)
St: Styrene
AN: Acrylonitrile
MMA: Methyl methacrylate

EXAMPLES 8 TO 11 AND COMPARATIVE EXAMPLES 3 AND 4

Procedure was repeated in the same manner as in Example 1 except that the same polyphenylene sulfide resin as used in Example 1, and monomers, benzoyl peroxide and fillers shown in Table 2 were used. In addition to the peeling test, bending tests and heat resistance tests (measurement of HDT) were carried out. The results are shown in Table 2.

TABLE 2

| | PPS (part by weight) | Monomer (part by weight) | | Polymerization initiator PBO (part by weight) | Filler (part by weight) | | | Bending strength (kg/cm$^2$) | Flexural modulus (kg/cm$^2$) | HDT (°C.) | Adhesive property of paint film |
|---|---|---|---|---|---|---|---|---|---|---|---|
| | | St | MMA | | GF | CF | Talc | | | | |
| Example 8 | 80 | 20 | — | 1 | 66 | | | 2300 | 125000 | 260 | O |
| Example 9 | 80 | 20 | — | 1 | | 43 | | 2000 | 205000 | 255 | ⊚ |
| Example 10 | 80 | 20 | — | 1 | | | 33 | 1200 | 48000 | 232 | ⊙ |
| Example 11 | 80 | 10 | 10 | 1 | 66 | | | 2300 | 126000 | 261 | O |
| Comparative Example 3 | 100 | — | — | — | 66 | | | 2600 | 142000 | 268 | X |
| Comparative Example 4 | 100 | — | — | — | | 43 | | 2200 | 217000 | 265 | X |
| Comparative Example 5 | 100 | — | — | — | | | 33 | 1400 | 58000 | 242 | X |

Note:
Talc: Hi-filler #12 produced by Tsuchiya Kaolin Industries Co.

EXAMPLE 12

95 Parts by weight of a powdery polyphenylene sulfide resin (Tohpren T-4 produced by Tohpren Co., Ltd.; average particle size, 50 μm), which is a polyarylene sulfide resin, 3 parts by weight of an unsaturated polyester ([η]=0.2) obtained from ethylene glycol and maleic acid anhydride, 2 parts by weight of styrene and 0.25 part by weight of benzoyl peroxide were mixed. The mixture was extruded through a twin-screw extruder (Werner & Pfleiderer 30 Φ) at a barrel temperature of 310° C. and pelletized on a pelletizer.

The resulting pellet was molded into a flat plate of 100×100×3 mm in size on an injection molding machine (IS-100 produced by Toshiba Machine Co., Ltd.) under a condition that the cylinder temperature was 310° C. and the mold temperature was 140° C. The appearance of the plate was inspected. The surface thereof was defatted by wiping it with methanol, and coated with an epoxy resin paint (Epona 2000 produced by Origin Denki Co.) under normal conditions. The peeling test was carried out. The results are shown in Table 3.

EXAMPLES 13 TO 19

Procedure was repeated in the same manner as in Example 1 except that the same polyphenylene sulfide resin and unsaturated polyester as used in Example 12 and monomers and polymerization initiators shown in Table 3 were mixed in proportions shown in Table 3. The results are shown in Table 3.

TABLE 3

| Example | PPS (part by weight) | Unsaturated polyester (part by weight) | Monomer (part by weight) | | Polymerization initiator (part by weight) | | Adhesive property of paint film | Appearance |
|---|---|---|---|---|---|---|---|---|
| | | | St | MMA | BPO | CPO | | |
| 12 | 95 | 3 | 2 | — | 0.25 | — | O | O |
| 13 | 90 | 6 | 4 | — | 0.5 | — | O | O |
| 14 | 80 | 12 | 8 | — | 0.5 | — | ⊚ | O |
| 15 | 80 | 12 | 8 | — | — | 0.5 | ⊚ | O |
| 16 | 80 | 3 | 17 | — | 1 | — | O | O |
| 17 | 80 | 17 | 3 | — | 0.25 | — | O | O |
| 18 | 80 | 12 | — | 8 | 0.5 | — | ⊚ | O |
| 19 | 80 | 12 | 4 | 4 | 0.5 | — | ⊚ | O |

EXAMPLES 20 TO 23

A flat plate was prepared in the same manner as in Example 1 except that the same polyphenylene sulfide resin and unsaturated polyester as used in Example 12 and monomers, fillers and polymerization initiators shown in Table 4 were mixed in proportions shown in Table 4. Subsequently, the mechanical characteristics, heat resistance and adhesive property of paint film were examined. The results are shown in Table 4.

TABLE 4

| Example | PPS (part by weight) | Unsaturated polyester (part by weight) | Monomer (part by weight) | | BPO (part by weight) | Filler (part by weight) | | | Bending strength (kg/cm$^2$) | Flexural modulus (kg/cm$^2$) | HDT (°C.) | Adhesive property of paint film |
|---|---|---|---|---|---|---|---|---|---|---|---|---|
| | | | St | MMA | | GF | CF | Talc | | | | |
| 20 | 80 | 12 | 8 | — | 0.5 | 66 | | | 2500 | 130000 | 263 | O |
| 21 | 80 | 12 | 8 | — | 0.5 | | 43 | | 2100 | 205000 | 262 | ⊙ |
| 22 | 80 | 12 | 8 | — | 0.5 | | | 33 | 1300 | 49000 | 240 | ⊚ |
| 23 | 80 | 12 | — | 8 | 0.5 | 66 | | | 2500 | 128000 | 262 | O |

EXAMPLES 24 TO 27

Extrusion, molding, painting and evaluation were carried out in the same manner as in Example 1 except that the same polyphenylene sulfide resin as used in Example 1, monomers shown in Table 5 and benzoyl peroxide were used. The results are shown in Table 5.

TABLE 5

| Example | PPS (part by weight) | Monomer (part by weight) | | | | | Polymerization initiator BPO (part by weight) | Adhesive property of paint film | Appearance |
|---|---|---|---|---|---|---|---|---|---|
| | | St | MAA | AA | MA | GA | | | |
| 24 | 90 | 7 | — | — | — | — | 1 | ⊚ | ○ |
| 25 | 90 | 7 | — | 3 | — | — | 1 | ⊚ | ○ |
| 26 | 90 | — | — | — | 10 | — | 1 | ○ | ○ |
| 27 | 90 | 5 | — | — | — | 5 | 1 | ○ | ○ |

Note:
MAA: Methacrylic acid
AA: Acrylic acid
MA: Methyl acrylate
GA: Glycidyl acrylate

EXAMPLES 28 AND 29

Pelletizing, injection molding and evaluation were carried out int the same manner as in Example 14 and 20 except that the polyphenylene sulfide resin was changed to a straight chain-type one (M-2588 produced by Toray Phillips Co., Ltd.). The results are shown in Tables 6 and 7.

TABLE 6

| Example | Adhesive property of paint film | Appearance |
|---|---|---|
| 28 | ○ | ○ |

TABLE 7

| Example | Bending strength (kg/cm²) | Flexural modulus (kg/cm²) | HDT (°C.) | Adhesive property of paint film |
|---|---|---|---|---|
| 29 | 2500 | 130000 | 263 | ○ |

What is claimed is:

1. A polyarylene sulfide resin composition comprising a resin composition obtained by polymerizing 0.1 to 40 parts by weight of 100 parts by weight of an polyarylene sulfide resin; and 3 to 40 parts by weight of an unsaturated polyester obtained by condensation polymerization of at least one dibasic acid having no ethylenic unsaturated double bond, at least one unsaturated dibasic acid and at least one dihydric alcohol.

2. A polyarylene sulfide resin composition according to claim 1, wherein the polymer composition contains as an additional component, 0 to 300 wt. % of a filler based on the total weight of the polyarylene sulfide resin, the monomer and the unsaturated polyester.

3. A polyarylene sulfide resin composition according to claim 1, wherein the polyarylene sulfide resin is a polyphenylene sulfide resin.

4. A polyarylene sulfide resin composition according to claim 1, wherein the monomer is at least one member selected from the group consisting of styrene, α-methylstyrene, (meth)acrylic acid, methyl (meth)-acrylate, glycidyl (meth)acrylate and acrylonitrile.

5. A polyarylene sulfide resin composition according to claim 1, wherein the total amount of the unsaturated polyester and the monomer is 5 to 40 parts by weight based on 100 parts by weight of the polyarylene sulfide resin.

6. A polyarylene sulfide resin composition according to claim 1, wherein the weight ratio of the unsaturated polyester to the monomer is 80:20 to 20:80.

7. A polyarylene sulfide resin composition according to claim 1, wherein the polymerization of the monomer is carried out in an extruder in a state wherein the polyarylene sulfide resin and unsaturated polyester are in a molten state. inside of an extruder in a state wherein the polyphenylene sulfide resin and other components are melt-mixed.

8. A polyarylene sulfide resin composition according to claim 2, wherein the filler is a glass fiber or a carbon fiber.

9. A polyarylene sulfide resin composition according to claim 1, wherein when the monomer is polymerized in a molten state of the polyarylene sulfide resin, a polymerization initiator having a half-life period of 1 minute or more at 100° C. is used in an amount of 0.01 to 20 parts by weight based on 100 parts by weight of the total weight of the polyarylene sulfide resin, the monomer, and the unsaturated polyester.

10. A polyarylene sulfide resin composition according to claim 1, wherein the unsaturated polyester is one obtained by the condensation polymerization of phthalic acid anhydride, maleic acid anhydride, propylene glycol and ethylene glycol.

* * * * *